(12) United States Patent
Arnn

(10) Patent No.: US 6,469,792 B1
(45) Date of Patent: Oct. 22, 2002

(54) METHOD FOR PROCESSING THE OUTPUT OF A FIBER OPTIC GYROSCOPE TO REDUCE THE EFFECTS OF VIBRATION THEREFROM

(75) Inventor: Edward L. Arnn, Torrance, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/516,419

(22) Filed: Mar. 1, 2000

(51) Int. Cl.[7] .............................................. G01C 19/72
(52) U.S. Cl. ....................................................... 356/464
(58) Field of Search ................... 356/460, 464

(56) References Cited

U.S. PATENT DOCUMENTS 5,684,591 A * 11/1997 Lo et al. ...................... 456/464
5,949,545 A * 9/1999 Lo et al. ...................... 356/464
6,002,481 A * 12/1999 Bielas et al. ................. 356/460

OTHER PUBLICATIONS

Lefevre, H. C., "High Dynamic Ranger Fiber Gyro with All–Digital Signal Processing", Fiber Optic and Laser Sensors VIII, SPIE, vol. 1367 (1990).

Brannon, Brad, "Overcoming Converter Nonlinearities with Dither", Analog Devices.

* cited by examiner

Primary Examiner—Samuel A. Turner
(74) Attorney, Agent, or Firm—Colin M. Raufer; Leonard A. Alkov; Glenn H. Lenzen, Jr.

(57) ABSTRACT

A system and method for processing the output of a fiber-optic gyroscope. The inventive circuit (10) includes a photodetector (24) for detecting electromagnetic energy received from the fiber-optic gyroscope (18,20) and providing an analog input signal in response thereto. An analog-to-digital converter (42) is provided for processing the analog input signal and providing a digital signal in response thereto. A source (30) is provided for injecting a dither signal between the photodetector (24) and the analog-to-digital converter (42). In the illustrative embodiment, the source (30) supplies a triangle wave signal. The output of the photodetector (24) is supplied to the summing input of a differential amplifier (29) and the output of the source (30) supplies the differencing input to the differential amplifier (29). The output of the analog-to-digital converter (42) is provided to a digital signal processor (44) as per usual practice.

1 Claim, 1 Drawing Sheet

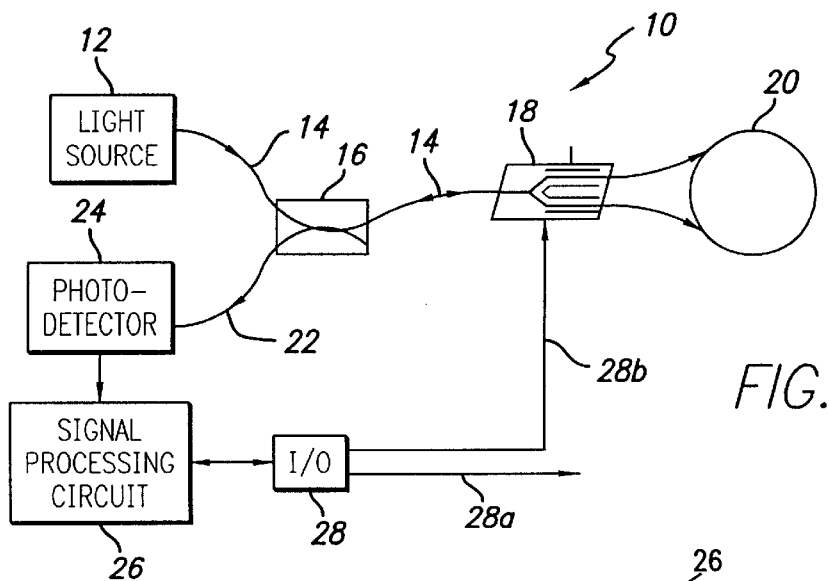
FIG. 1
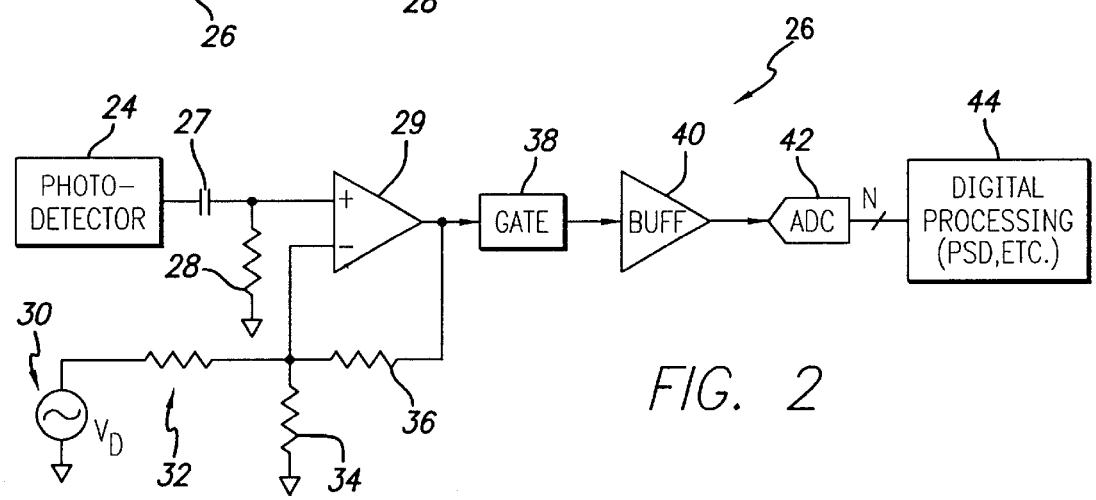
FIG. 2
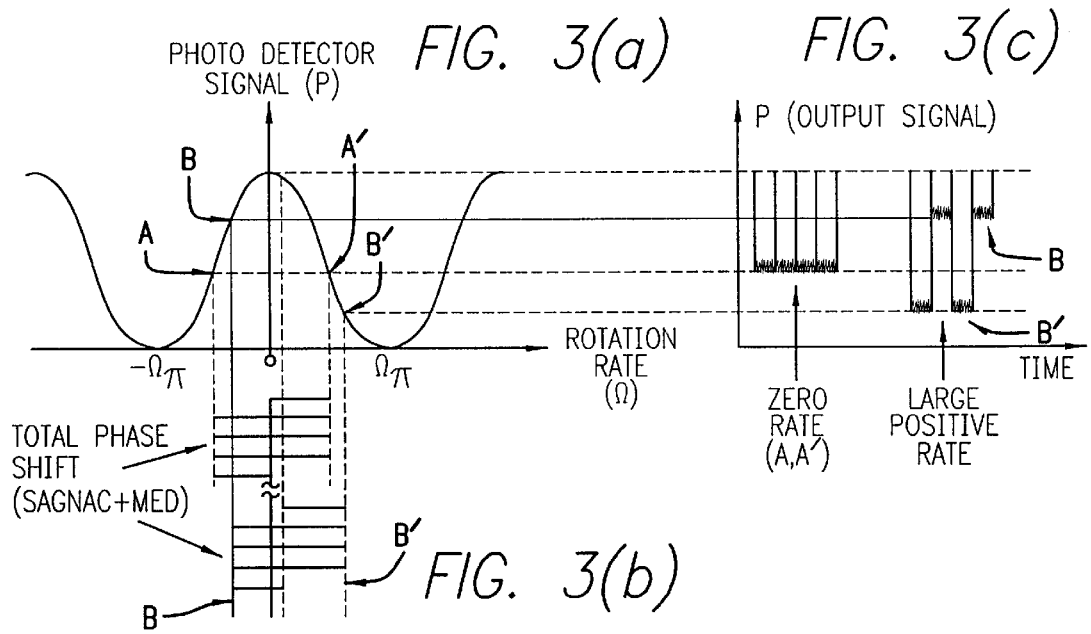
FIG. 3(a)
FIG. 3(b)
FIG. 3(c)

METHOD FOR PROCESSING THE OUTPUT OF A FIBER OPTIC GYROSCOPE TO REDUCE THE EFFECTS OF VIBRATION THEREFROM

This invention was made with Government support under Subcontract No. E80011 (The Boeing Company), which is a subcontract under Government Prime Contract No. N00019-97-C0009, and which was awarded by the Department of the Navy. The Government has certain rights in this invention.

BACKGROUND OF THE INVENTION

1. Field of the Invention

The present invention relates to gyroscopes. More specifically, the present invention relates to fiber optic gyroscopes and associated signal processing circuitry.

2. Description of the Related Art

Gyroscopes are widely used to detect angular motion. Conventional mechanical gyroscopes were constructed with spinning masses which tended to resist translational and rotational motion of the host vehicle. Various sensors including potentiometers, differential inductive (e.g., microsyn), and differential capacitive methods have been used to sense the movement of the vehicle relative to the resistance of the gyroscope and provided a signal indicative of the angular motion.

Conventional gyroscopes required a spinning mass to detect angular motion. For certain applications, these masses, and their response to input motion about axes other than the intended input axis, imposed undesirable constraints on system design and/or performance. Accordingly, other technologies have been developed to detect acceleration. The fiber-optic gyroscope is one such alternative technology. The fiberoptic gyroscope employs a coil of optical fiber into which two beams of light are injected so that they travel in opposite directions therethrough. As the vehicle undergoes angular motion about the axis of the coil, light traveling in one direction will travel a shorter distance while light traveling in the opposite direction will travel a greater distance. Known as the "Sagnac Effect", the result is a phase shift that alters an interference pattern, created by recombining the two light beams. The intensity of the interference pattern is detected by a photodetector and converted to an electrical signal for subsequent processing.

Initially, the output of the fiber optic gyro interferometer was transformed to an electrical signal and processed with analog circuitry. Unfortunately, the associated analog demodulators were subject to various bias sources and electronic drift. Accordingly, numerous digital signal-processing techniques have been explored.

The classic "all-digital" signal processing technique for the interferometric fiber-optic gyroscope (FOG) was spelled out by H. C. Lefevre in "High Dynamic Range Fiber Gyro with All-Digital Signal Processing," *Fiber Optic and Laser Sensors VIII*, SPIE Vol. 1367 (1990). One of the key aspects of this approach involved the replacement of an analog phase sensitive detector (PSD) that processes the output of the FOG photodetector with an analog to digital converter (ADC) and a digital PSD. This eliminated most of the sources of drift and bias.

However, since the Sagnac effect upon which the FOG is based is extremely weak, optical phase shifts of less than one microradian must be faithfully measured. This is done by scaling the inherent photon shot noise from the photodetector to be greater than one least significant bit (LSB) root mean square (rms) at the input to the ADC. This noise whitens the quantization and allows the high data rate interferometer output signal (100 kHz to 1 MHz typical) to be averaged deep into the LSB permitting the measurement of a signal with a very small amplitude.

Since Lefevre's paper in 1990, many variations of signal gating, filtering and ADC sampling schemes have evolved within this framework. However, recent work has shown that small imperfections in quantization by the ADC (particularly INL and DNL errors) can cause large bias errors in the face of vibration, power supply drift or ripple on the power supply. These errors have caused the performance of the conventional fiber-optic gyroscope to be unacceptable for certain current applications. That is, since the averaging must go deeper than $1/1000^{th}$ of the LSB, near perfection is required.

Consequently, there is a need in the art for a system and/or technique for improving the accuracy of fiber-optic gyro digital processing circuitry.

SUMMARY OF THE INVENTION

The need in the art is addressed by the present invention. In a most general description, the invention is a circuit for processing the output of a fiber-optic gyroscope. The inventive circuit includes a photodetector for detecting electromagnetic energy received from the fiber-optic gyroscope interferometer and providing an analog input signal in response thereto. An analog-to-digital converter is provided for processing the analog input signal and providing a digital signal in response thereto. A source is provided for injecting a dither signal between the photodetector and the analog-to-digital converter.

In the illustrative embodiment, the source supplies a triangle wave signal. The output of the photodetector is supplied to the summing input of a differential amplifier and the output of the source supplies the differencing input to the differential amplifier. The output of the analog-to-digital converter is provided to a digital signal processor as per usual practice.

Hence, the invention is a simple system and method for the addition of a dither signal to the input of the ADC. This signal has the effect of smoothing or averaging the non-linearities up through the digitization step and reduces the gyro drift caused by vibration and certain electrical disturbances. It has also been shown to reduce so called "toggling" instability, warm-up drift, and other unidentified sources of bias instability in fiber-optic gyros.

BRIEF DESCRIPTION OF THE DRAWINGS

FIG. 1 is a block diagram of a fiber optic gyroscope constructed in accordance with the teachings of the present invention.

FIG. 2 is a block diagram of the signal processing circuit of the gyroscope of FIG. 1 implemented in accordance with the teachings of the present invention.

FIGS. 3(a)–3(c) are a set of interrelated graphs illustrative of the operation of a fiber optic gyroscope. FIG. 3(a) is a graph of the output of a fiber optic gyroscope photodetector as a function of angle rate ($\Omega$). FIG. 3(b) is a graph of photodetector phase shift as a function of angle rate including the effect of square-wave biasing, as is commonly done. FIG. 3(c) is a graph of photodetector output power as a function of time.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 1 is a block diagram of a fiber optic gyroscope constructed in accordance with the teachings of the present invention. As shown in FIG. 1, the fiber optic gyro includes a light source 12, which launches a beam into an optical fiber 14. The fiber 14 feeds a 3 dB splitter 16. The splitter 16 couples the return beam to a second optical fiber 22 as discussed more fully below. The first fiber 14 terminates in a phase shifter 18 on one end thereof. The second end of the phase shifter 18 is attached to two ends of a coil 20 consisting of a third fiber. The phase shifter 18 is the combination of a Y-coupler and an optical phase shifter. The phase shifter 18 launches light from the source in opposite directions through the coil 20. The coil 20 is oriented to detect rotation about an axis into the page and through the center thereof.

As is well known in the fiber optic interferometer art, a rotation of the coil 20 about its axis causes light traveling in one direction to travel further than light traveling in the opposite direction. The phase shifter 18 is an integrated optical circuit (IOC) that works with the coil 20 to provide a Sagnac interferometer. The Sagnac interferometer serves to detect the interference pattern in the coil 20 created by the relative phase shift of the two beams due to the rotation. The interference pattern is detected by the second fiber 22 and the photodetector 24. The output of the photodetector 24 is input to the signal processing circuit 26 as an analog signal. As discussed more fully below, the signal processing circuit 26 processes the analog signal and determines a rate and direction of rotation. The output of the signal processing circuit 26 is provided to appropriate input and output (I/O) circuitry 28. The signal 28a provides angular motion information to the using system. Signal 28b provides biasing phase commands to the IOC as well as possible feedback for closed-loop operation.

FIG. 2 is a block diagram of the signal processing circuit 26 constructed in accordance with the teachings of the present invention.

FIGS. 3(a)–(c) are a set of interrelated graphs illustrative of the operation of a fiber optic gyroscope. That is, FIG. 3(a) is a graph of the output of a fiber optic gyroscope photodetector as a function of angle rate ($\Omega$). FIG. 3(b) is a graph of photodetector phase shift as a function of angle rate including the effect of square-wave biasing via the IOC. FIG. 3(c) is a graph of photodetector output power as a function of time. As shown in FIG. 3(a), the intensity of the output of the interferometer, as a function of phase, varies as a raised cosine function due to rotation of the fiber optic coil in inertial space. This is known in the art as the "Sagnac phase shift". The phase shifter 18 allows the Sagnac phase shift to be biased away from zero to A and A' to improve sensitivity and linearity. If the phase shifter 18 is used to periodically shift the length of the path by +/-$\pi$/2 at the so-called eigenfrequency of the light traveling through the coil, the resultant light output intensity will be a linearized double sideband (DSB) signal modulated by the rotation rate of the coil as depicted in FIGS. 3(b) and (c). The present teachings are not limited to use of the eigenfrequency of the fiber optic coil as the modulation frequency of the phase shifter. Other frequencies may be used to bias the coil without departing from the scope of the present teachings.

When the interferometer is rotated, the linearized operating points A and A' shift to B and B' with the resulting changes in output signal depicted in FIGS. 3(b) and (c). Hence, successful utilization of the interferometer requires that the output of the photodetector be processed to extract the information in the signal depicted in FIG. 3(c).

Initially, analog phase sensitive detectors were used to demodulate the rate signal from the coil/IOC combination. Lefevre showed the advantage of digitizing the signal and moving the PSD into the digital domain. To do this, samples from the two half cycles are digitized and then differenced digitally. With this approach, almost all of the error sources in the analog processing and ADC become common mode, and accuracy and stability are great improved.

However, since the Sagnac effect upon which the FOG is based is extremely weak, optical phase shifts of less than one microradian must be faithfully measured. This is done by scaling the inherent photon shot noise to be greater than one LSB rms at the input to the ADC. This allowed the high data rate interferometer output signal (100 kHz to 1 MHz typical) to be averaged deep into the LSB.

However, recent work to discover the mechanism of bias generation by vibration led to the understanding that in the presence of certain coherent combinations of signals, ADC INL (Integral Nonlinearity) and DNL (Differential Nonlinearity) errors will give rise to noise rectification and large biases can be generated.

Recent work by the present inventor has shown that small imperfections in the ADC (INL and DNL errors) can cause large bias errors in the face of vibration or power supply ripple. It is a purpose of the present invention to eliminate the effect of these errors. In accordance with the present teachings, a dither signal is added to the input to the ADC of the signal processing circuit 26 of FIG. 1. The dither signal smoothes or averages the non-linearities up through the digitization process and provides a reduction in gyro drift caused by random vibration and ripple on the power supplies. It also reduces so called "toggling" instability, warm-up drift, and other unidentified sources of bias instabilities in FOGs.

An illustrative implementation of the teachings of the present invention are provided in FIG. 2. As mentioned above, FIG. 2 is a block diagram of the signal processing circuit 26 constructed in accordance with the teachings of the present invention. The signal processing circuit 26 includes a high pass filter consisting of a capacitor 27 and a resistor 28. The capacitor 27 and resistor 28 filter the output of the photodetector 24 and couple the resulting analog input signal to the summing junction of a differential amplifier 29. In a conventional implementation, the output of the amplifier 29 would be fed to an ADC 42 via a gating circuit 38 and a buffer amplifier 40. The output of the ADC 42 would then be digitally processed in a digital processing circuit 44.

However, in accordance with the present teachings, a dither signal is injected into the circuit between the output of the photodetector 24 and the input to the ADC 42. In the illustrative embodiment, the signal is injected at the differencing junction of the differential amplifier 29 from a source 30 through a resistor 32. Biasing resistors 34 and 36 are shown, as is common practice in the art.

In the illustrative embodiment, the source 30 provides a triangle wave dither signal. Those skilled in the art will appreciate that other types of waveforms may be used and the dither signals may be injected anywhere in the path between the photodetector and the ADC without departing from the scope of the present teachings. Use of zero offset in the dither waveform minimizes the change in operating conditions in the rest of the signal processing chain.

The amplitude of the dither signal is application dependent and should generally be many LSBs peak-to-peak to provide additional smoothing beyond that caused by the 1 LSB rms shot noise from the photodetector. The required amplitude may be a large fraction of the ADC input range depending on the type of non-linearity troubling the FOG signal processing chain.

The dither frequency is non-critical as long as it is far removed from the modulation frequency (carrier) used to bias the interferometer assuring it is indeed "out of band." With the scaling inherent in the typical FOG, the effect of the added dither signal will be buried deeply within the output noise (angle random walk) and no special measures are required to estimate and cancel the undesired side effect of using dither.

However, it may desirable to place the dither frequency beyond the bandwidth of the FOG output processing to further suppress its effects. Use of a frequency that avoids conflicts with known vibrational or power supply ripple frequencies may also be desirable. In special cases, use of band-limited random noise, rather than a periodic signal may avoid frequency conflicts and error from higher-order interactions.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly, what is claimed is:

1. A method for processing the output of a fiber-optic gyroscope to remove the effects of vibration therefrom including the steps of:

detecting electromagnetic energy received from said fiber-optic gyroscope and providing an analog input signal in response thereto;

injecting a dither signal into said input signal; and converting said input signal into a digital signal with an analog to digital converter, said a dither signal having an amplitude of several least significant bits peak to peak relative to said analog to digital converter.

* * * * *